(12) United States Patent
Zhu et al.

(10) Patent No.: US 12,739,321 B2
(45) Date of Patent: Sep. 15, 2026

(54) MULTIFUNCTIONAL ELECTRONIC EQUIPMENT HOLDER

(71) Applicant: PGYTECH CO., LTD, Jiangsu (CN)

(72) Inventors: Liang Zhu, Jiangsu (CN); Chaohao Pan, Hubei (CN)

( * ) Notice: Subject to any disclaimer, the term of this patent is extended or adjusted under 35 U.S.C. 154(b) by 222 days.

(21) Appl. No.: 18/819,762

(22) Filed: Aug. 29, 2024

(65) Prior Publication Data

US 2026/0067390 A1 Mar. 5, 2026

(51) Int. Cl.

| | |
|---|---|
| ***H04M 1/04*** | (2006.01) |
| ***F16M 11/04*** | (2006.01) |
| ***F16M 11/10*** | (2006.01) |
| ***F16M 11/38*** | (2006.01) |
| ***F16M 13/00*** | (2006.01) |
| ***F16M 13/02*** | (2006.01) |
| ***F16M 13/04*** | (2006.01) |

(52) U.S. Cl.

CPC ............ *H04M 1/04* (2013.01); *F16M 11/041* (2013.01); *F16M 11/046* (2013.01); *F16M 11/10* (2013.01); *F16M 11/38* (2013.01); *F16M 13/00* (2013.01); *F16M 13/022* (2013.01); *F16M 13/04* (2013.01)

(58) Field of Classification Search

CPC ................................ H04M 1/04; F16M 11/38

See application file for complete search history.

(56) References Cited

U.S. PATENT DOCUMENTS

| | | | | |
|---|---|---|---|---|
| 11,563,838 | B1 * | 1/2023 | Sham | H04M 1/0202 |
| 11,985,264 | B1 * | 5/2024 | Han | A47B 23/044 |
| 12,228,238 | B2 * | 2/2025 | Ferraris | F16M 11/041 |
| 2024/0308436 | A1 * | 9/2024 | Yao | A45F 5/10 |
| 2025/0137581 | A1 * | 5/2025 | Fan | F16M 13/022 |
| 2026/0009498 | A1 * | 1/2026 | Kuo | F16M 11/041 |
| 2026/0067390 | A1 * | 3/2026 | Zhu | H04M 1/04 |

FOREIGN PATENT DOCUMENTS

| | | | |
|---|---|---|---|
| CN | 223194741 U | * | 8/2025 |
| CN | 223528098 U | * | 11/2025 |

* cited by examiner

*Primary Examiner* — Patrick F Marinelli

(74) *Attorney, Agent, or Firm* — Hawaii Patent Services; Nathaniel K. Fedde; Kenton N. Fedde

(57) ABSTRACT

A multifunctional electronic equipment holder comprises a seat, a fixing bracket and a magnetic attraction structure, wherein the fixing bracket is hinged on the seat through a hinge shaft, an elastic band is arranged on the seat, and the elastic band is obliquely arranged relative to the extending direction of the seat; the magnetic attraction structure comprises a first magnetic attraction member and a second magnetic attraction member; the seat is provided with a first surface and a second surface which are oppositely arranged, so that the electronic equipment is fixed on the fixing bracket for low-angle shot by the user, and the rear camera of the electronic equipment can face upwards, which is convenient for users to take pictures from below.

15 Claims, 5 Drawing Sheets

MULTIFUNCTIONAL ELECTRONIC EQUIPMENT HOLDER

TECHNICAL FIELD

The present invention relates to the field of digital accessories, in particular to an electronic equipment holder.

BACKGROUND

At present, the mobile phone is an indispensable electronic equipment in people's daily life. In order to free their hands, people often use the mobile phone stand to support the mobile phone on the desktop. However, there are still many shortcomings in the existing mobile phone stand, most of which can only support the positive 180-degree small angle adjustment, or can only be held by one hand with a vertical screen, or can only achieve a simple magnetic attraction function.

The U.S. Pat. No. 11,156,324 discloses a clamping holder, wherein a clamping mechanism is disclosed. The clamping mechanism on a clamping arm clamps the mobile phone through an upper clamping part and a lower clamping part, and the mobile phone is adjusted in angle and locked after adjustment through a connecting arm and a locking member which are rotatably connected with the clamping arm.

However, the clamping holder disclosed above has a single function in pursuit of the stability when holding. The mobile phone only has a common way of clamping the back of the mobile phone, and the vertical and horizontal use of the mobile phone is adjusted by twisting the clamping mechanism. This arrangement makes the adjustment of the mobile phone on the holder not flexible enough in practical use. First of all, it cannot meet the demand of clamping the front and back of the mobile phone, and the adjustable angle is limited to about 120 degrees when using; moreover, two hands are required to adjust the horizontal and vertical direction of the mobile phone, which is not suitable for most scenes.

SUMMARY

The present invention provides a multifunctional electronic equipment holder to solve the problems of single holder function, fixed and rigid application mode and inability to adapt to complex and changeable mobile phone application scenarios.

In order to achieve the above object, the present invention adopts the following technical solutions:

the present invention provides a multifunctional electronic equipment holder, which includes a fixing bracket for placing electronic equipment and a seat for supporting the fixing bracket, wherein the fixing bracket is rotatably connected to the seat; the seat has a first surface and a second surface which are oppositely arranged, and the electronic equipment holder has a first use state and a second use state; and in the first use state, the fixing bracket is arranged at an acute angle relative to the seat, and the first surface of the seat faces the fixing bracket; and in the second use state, the fixing bracket is arranged at an acute angle relative to the seat, and the second surface of the seat faces the fixing bracket.

The present invention further provides a multifunctional electronic equipment holder, which includes a seat provided with an elastic band obliquely arranged relative to an extending direction of the seat; a fixing bracket rotatably connected with the seat and used for placing electronic equipment; when the fixing bracket rotates relative to the seat, a rotation angle can be maintained between the fixing bracket and the seat; the seat has a first surface and a second surface which are oppositely arranged, and the electronic equipment holder has a first use state and a second use state; in the first use state, the fixing bracket is arranged at an acute angle relative to the seat, and the first surface of the seat faces the fixing bracket; and in the second use state, the fixing bracket is arranged at an acute angle relative to the seat, and the second surface of the seat faces the fixing bracket; and the fixing bracket is provided with a magnetic attraction component, and the magnetic attraction component includes: a first magnetic attraction member that adsorbs the electronic equipment horizontally arranged on the fixing bracket; and a second magnetic attraction member matched with the first magnetic attraction member to adsorb the electronic equipment vertically arranged on the fixing bracket.

The present invention also provides a multifunctional electronic equipment holder, which includes a seat provided with an elastic band which is convenient to hold; and a fixing bracket rotatably connected with the seat and used for placing electronic equipment; when the fixing bracket rotates, a rotation angle can be maintained between the seat and the fixing bracket; the seat has a first surface and a second surface which are oppositely arranged, and the electronic equipment holder has a first use state and a second use state; in the first use state, the fixing bracket is arranged at an acute angle relative to the seat, and the first surface of the seat faces the fixing bracket; in the second use state, the fixing bracket is arranged at an acute angle relative to the seat, and the second surface of the seat faces the fixing bracket; the fixing bracket is provided with a magnetic attraction component, and the magnetic attraction component includes: a first magnetic attraction member that adsorbs the electronic equipment horizontally arranged on the fixing bracket; and a second magnetic attraction member matched with the first magnetic attraction member to adsorb the electronic equipment vertically arranged on the fixing bracket

Figure 1:
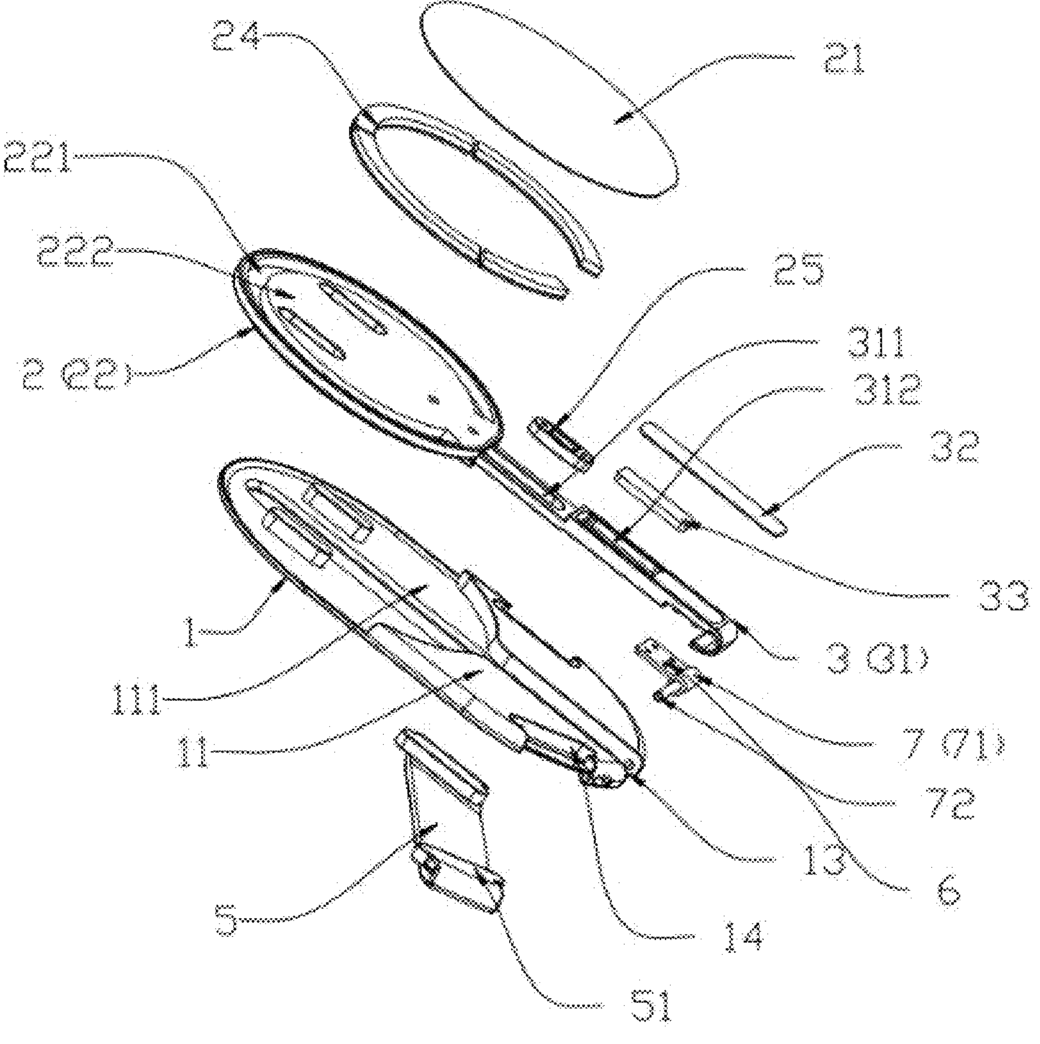
FIG. 1 is an exploded view of an electronic equipment holder according to a preferred embodiment of the present application.

Reference signs: seat (1); First surface (11); Embedding groove (111); Second surface (12); Slot (13); Buckle groove (14); Base (2); Front cover plate (21); Middle plate (22); First mounting groove (221); Avoidance space (222); Rear cover plate (23); First magnetic attraction member (24); Slider (25); Connecting rod (3); Connecting rod body (31); Chute (311); Second mounting groove (312); Cover sheet (32); Second magnetic attraction member (33); Electronic equipment (4); Rear camera (41); Elastic band (5); Fastener (51); Hinge shaft (6); Damping sheet (7); Damping tube (71); Fixing sheet (72); Third magnetic attraction member (9).

DESCRIPTION OF EMBODIMENTS

Figure 2:
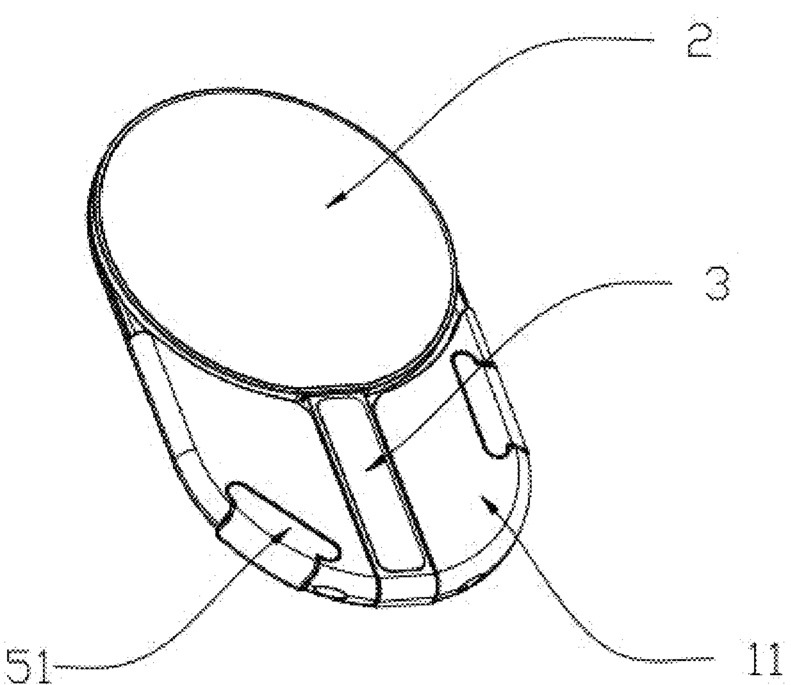
FIG. 2 is a schematic view of the electronic equipment holder in a storage state according to the preferred embodiment of the present application.
Figure 3:
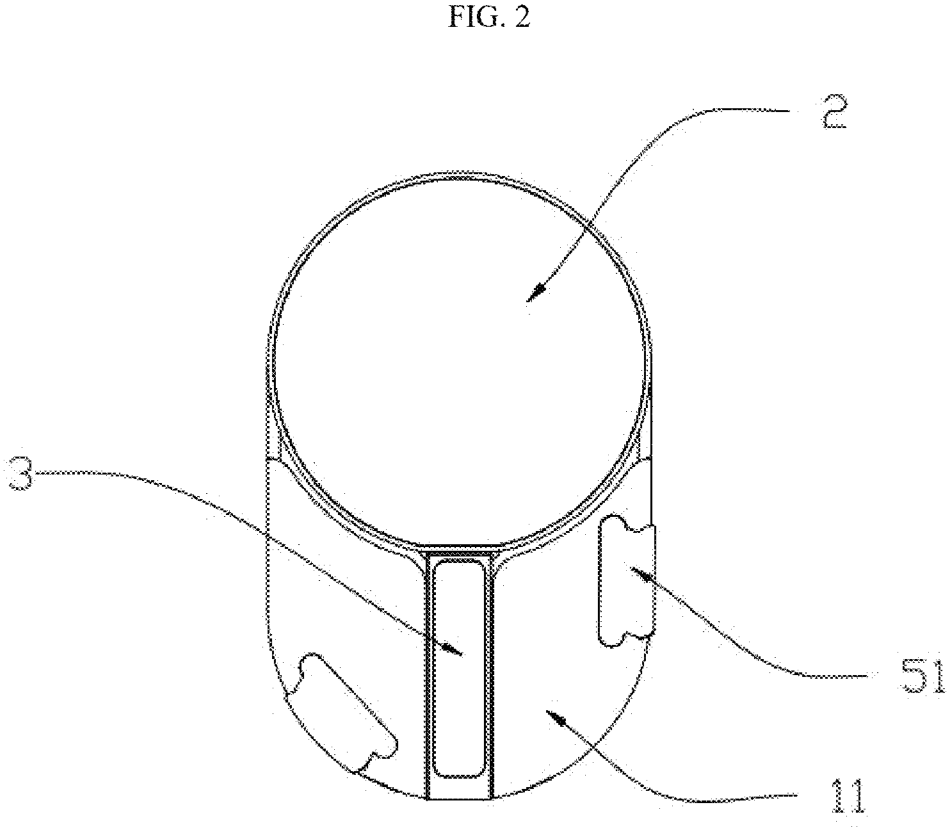
FIG. 3 is a front schematic view of the electronic equipment holder in a storage state according to the preferred embodiment of the present application.
Figure 4:
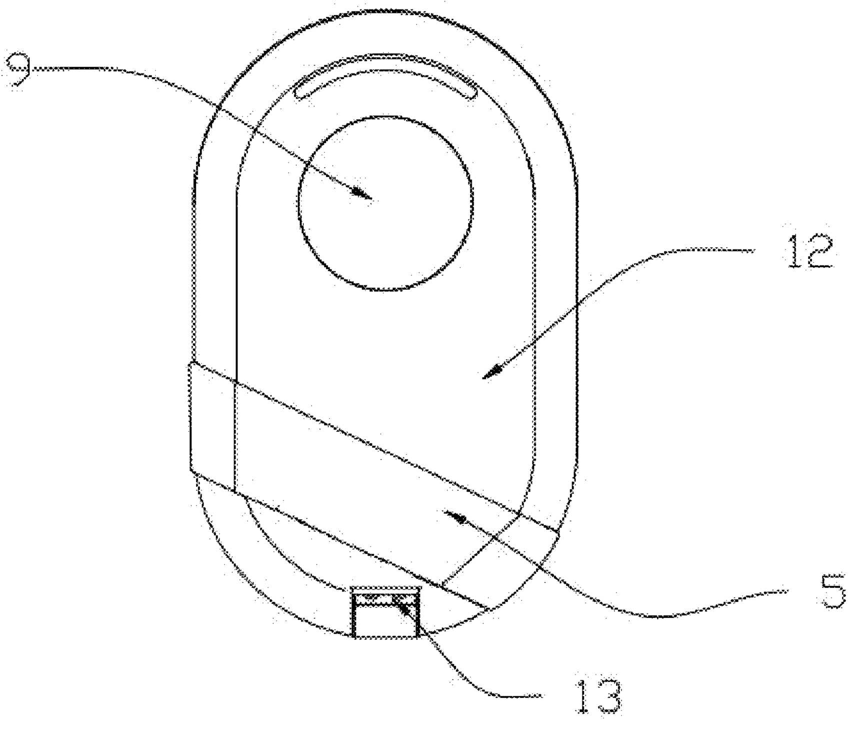
FIG. 4 is a schematic diagram of the back of the electronic equipment holder in a storage state according to the preferred embodiment of the present application.
Figure 5:
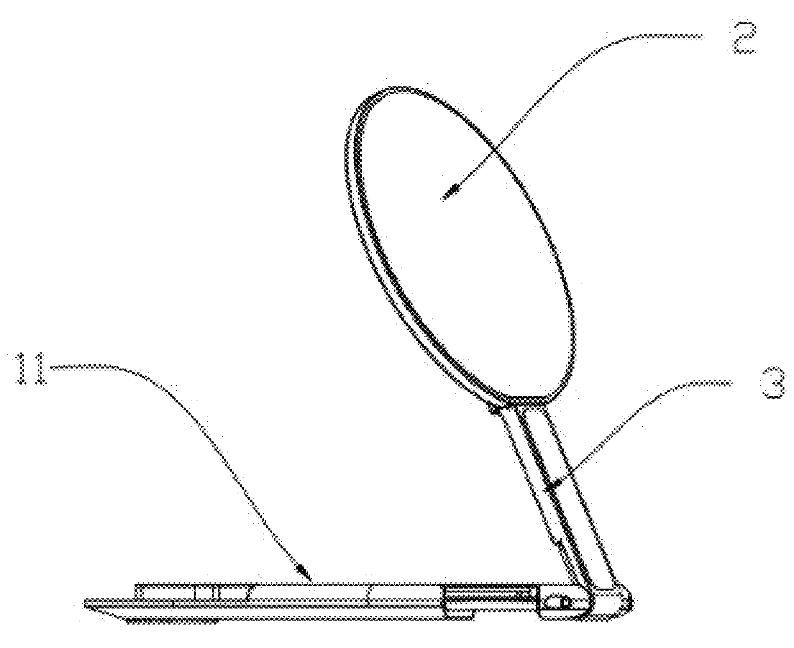
FIG. 5 is a schematic view of the electronic equipment holder in a contracted state according to the preferred embodiment of the present application.
Figure 6:
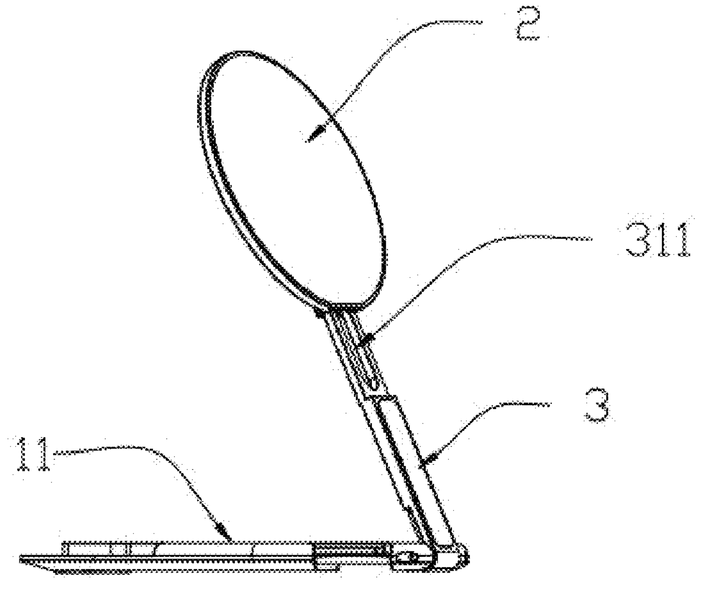
FIG. 6 is a schematic diagram of the electronic equipment holder in an extended state according to the preferred embodiment of the present application.
Figure 7:
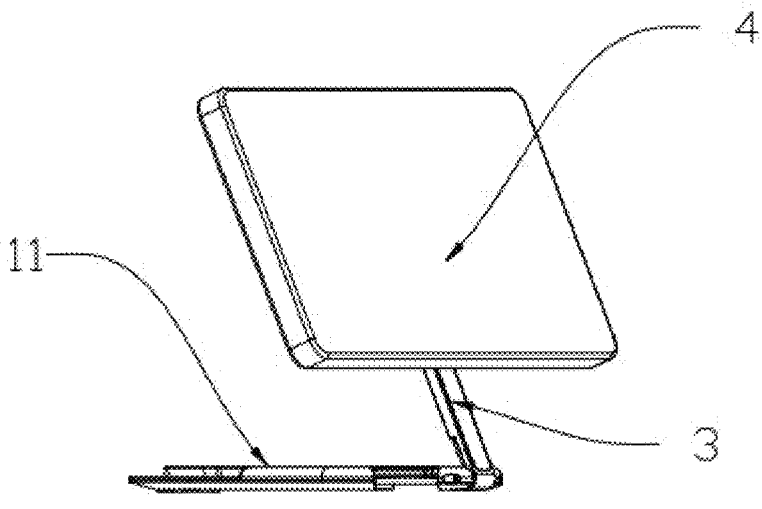
FIG. 7 is a schematic diagram of the electronic equipment holder in a first use state and a first placement state according to the preferred embodiment of the present application.
Figure 8:
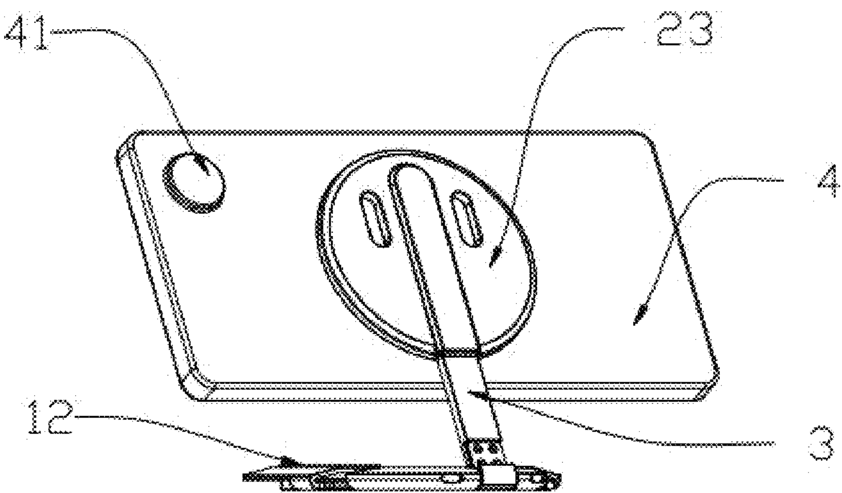
FIG. 8 is a schematic diagram of the electronic equipment holder in a second use state according to the preferred embodiment of the present application.
Figure 9:
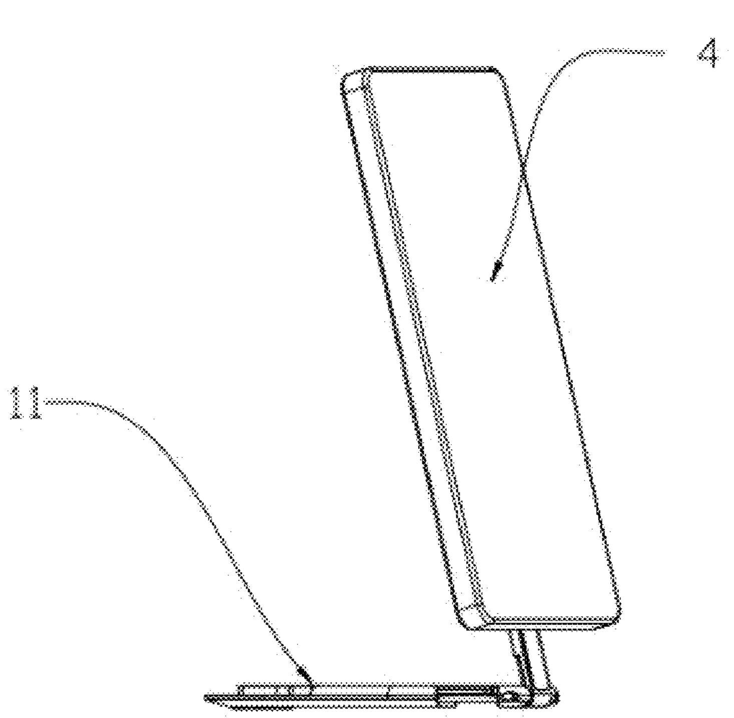
FIG. 9 is a schematic diagram of the electronic equipment holder in a second placement state according to the preferred embodiment of the present application.

As shown in FIGS. 1-9, the present invention provides a multifunctional electronic equipment holder, which includes a seat 1 and a fixing bracket, wherein the fixing bracket is hinged on the seat 1 through a hinge shaft 6, the seat 1 is used for placing on a plane, and the fixing bracket is used for fixing electronic equipment 4. The seat 1 is provided with an elastic band 5, and the elastic band 5 is obliquely arranged in the extending direction of the seat 1. The seat 1 has a first surface 11 and a second surface 12 which are oppositely arranged, and the electronic equipment holder has a first use state and a second use state. In the first use state, the first surface 11 of the seat 1 faces the fixing bracket, and the fixing bracket is arranged at an acute angle relative to the seat 1. In the second use state, the second surface 12 of the seat 1 faces the fixing bracket, and the fixing bracket is arranged at an acute angle relative to the seat 1.

The electronic equipment holder of this embodiment has a seat 1 and a fixing bracket hinged on the seat 1 through a hinge shaft 6. The seat 1 is used for placing on a plane, and the fixing bracket is used for fixing the electronic equipment 4. The seat 1 has a first surface 11 and a second surface 12 which are oppositely arranged. The electronic equipment holder of this embodiment has a first use state and a second use state. In the first use state, the first surface 11 of the seat 1 faces the fixing bracket, and the fixing bracket is arranged at an acute angle relative to the seat 1. In the second use state, the second surface 12 of the seat 1 faces the fixing bracket, and the fixing bracket rotates around the hinge shaft 6 and is arranged at an acute angle relative to the seat 1. At this time, the electronic equipment 4 is fixed on the fixing bracket, and the rear camera 41 of the electronic equipment 4 faces upward, which is convenient for low-angle shot by the user. The electronic equipment stand of this embodiment can support both viewing and low-angle shot of the rear camera 41 at the same time, so as to meet different use requirements of users.

The electronic equipment holder of this embodiment can be used to support various electronic equipment 4 such as mobile phones, tablets, computers and the like, and can satisfy the use of the electronic equipment 4 for viewing and the rear camera 41 for low-angle shot.

The seat 1 and the holder of the electronic equipment 4 in this embodiment are hinged by a hinge shaft 6, and the shapes of the seat 1 and the fixing bracket are not limited. Preferably, the seat 1 is rectangular or quasi-rectangular or elliptical.

Of course, the electronic equipment holder of this embodiment can have other use states besides the first use state and the second use state. For example, when the first surface 11 of the seat 1 faces the fixing bracket, the fixing bracket also has a third use state in which there is an obtuse angle between the fixing bracket and the seat 1. In the third use state, the front camera is set downward, which can meet the demand of the front camera for high-angle shot. When the second surface 12 of the seat 1 faces the fixing bracket, the fixing bracket also has a fourth use state in which there is an obtuse angle between the fixing bracket and the seat 1. In the fourth use state, the fixing bracket is arranged at an obtuse angle relative to the seat 1, and the rear camera 41 faces downward, which can meet the high-angle shot demand of the rear camera 41.

In other embodiments, besides the existing hinge shaft 6, gear transmission, worm gear and spring damping system can be considered to control the angle between the fixing bracket and the seat 1 more accurately. These mechanisms can provide a smoother and more stable angle adjustment experience and allow users to lock the electronic equipment 4 at a specific angle.

In this embodiment, the edge of the seat 1 is provided with a slot 13, the hinge shaft 6 is fixed on the slot wall of the slot 13, the fixing bracket is hinged with the seat 1 through the hinge shaft 6. The hinge shaft 6 is provided with a damping structure, which can keep the fixing bracket at an acute angle relative to the seat 1 in the first use state. In addition, the seat 1 is also provided with a limiting structure, which can support the fixing bracket on the seat 1 and maintain acute angle support in the second use state. In this embodiment, the limiting structure is an inner wall opposite to the notch of the slot 13. In other embodiments, the limiting structure can also be arranged on the hinge shaft 6, or a limiting rib for limiting the rotation of the hinge shaft 6 is arranged on the second surface 12 of the seat 1. In this embodiment, the damping structure is a damping sheet 7 connected with the fixing bracket and sleeved on the hinge shaft 6. In other embodiments, the damping structure can also be a damping tube 71 or other accessories with damping function. It can be understood that the fixing bracket of this embodiment can rotate relative to the seat 1 under the action of the hinge shaft 6, and the rotation angle exceeds 180 degrees.

In this embodiment, the fixing bracket includes a base 2 and a connecting rod 3, one end of which is hinged with the seat 1, and the other end of which is connected with the base 2. The base 2 is used for fixing electronic equipment 4, and the distance between the base 2 and the hinge shaft 6 is adjustable. By adjusting the distance between the base 2 and the hinge shaft 6, the height between the base 2 and the seat 1 can be adjusted, and the telescopic function can be realized. It can be understood that the distance between the base 2 and the hinge shaft 6 can be adjusted by folding or stretching the connecting rod 3. In this embodiment, the base 2 is fixedly provided with a slider 25, and the connecting rod 3 is provided with a chute 311. The slider 25 can adjust the position of the base 2 relative to the connecting rod 3 by sliding in the chute 311, thus realizing the telescopic function. It can be understood that the electronic equipment 4 can be fixed on the base 2 by a clamping structure or a magnetic attraction structure, and the specific fixing method is not limited. The base 2 is slidably connected with the connecting rod 3 through the slider 25, and the lower end of the connecting rod 3 is hinged with the seat 1. Specifically, the lower end of the connecting rod 3 is hinged with the seat 1 through the damping sheet 7. The damping sheet 7 includes a damping tube 71 and a fixing sheet 72 which are integrally arranged. The damping tube 71 is sleeved on the hinge shaft 6, and the fixing sheet 72 is fixedly connected with the connecting rod 3. In the process of rotating the connecting rod 3, the damping sheet 7 rotates, and the damping sheet 7 can inhibit the connecting rod 3 from rotating, thus achieving the damping effect, so that the connecting rod 3 is angularly supported with the base 1.

In other embodiments, in addition to the sliding connection between the slider 25 and the chute 311, the distance between the base 2 and the connecting rod 3 can be adjusted by using a telescopic rod, a screw adjusting mechanism (such as the cooperation of a threaded rod and a nut), a rack-and-pinion mechanism, etc. These alternatives can realize the position adjustment of the base 2 relative to the connecting rod 3, so as to realize the telescopic function.

In other embodiments, besides using the damping sheet 7 (including the damping tube 71 and the fixing sheet 72), it is also possible to consider using liquid or semi-solid materials such as damping oil and damping grease to fill the contact between the hinge shaft 6 and the connecting rod 3 to achieve the damping effect. In addition, mechanical structures such as friction plates and torsion springs can also be used to provide a damping force.

In this embodiment, the holder also has a first placement state and a second placement state. The base 2 is provided with the first magnetic attraction member 24, and the connecting rod 3 is provided with the second magnetic attraction member 33 below the chute 311. When in the first placement state, the electronic equipment 4 is horizontally attracted to the base 2, and the first magnetic attraction member 24 is attracted to the electronic equipment 4. When in the second placement state, the electronic equipment 4 is vertically adsorbed on the base 2, and the second magnetic attraction member 33 and the first magnetic attraction member 24 are simultaneously adsorb the electronic equipment 4, thus ensuring the reliability of adsorption. The electronic equipment holder of this embodiment can realize reliable adsorption for the horizontal screen and the vertical screen by simultaneously arranging the first magnetic attraction member 24 and the second magnetic attraction member 33. It can be appreciated that the second magnetic attraction member 33 may not be provided.

Specifically, the connecting rod 3 includes a connecting rod main body 31 and a cover sheet 32, and the connecting rod body 31 is provided with a second mounting groove 312. The second magnetic attraction member 33 is installed on the connecting rod main body 31 through the second mounting groove 312, and the cover sheet 32 covers the second mounting groove 312 for shielding.

Specifically, the base 2 includes a front cover plate 21, a middle plate 22 and a rear cover plate 23. An avoidance space 222 is convexly formed at the center of the middle plate 22, and the slider 25 is fixed in the avoidance space 222. The connecting rod 3 can slide in the avoidance space 222, the edge of the middle plate 22 is folded and forms a first mounting groove 221 with the cavity wall of the avoidance space 222. The front cover plate 21 and the rear cover plate 23 respectively cover the front and rear ends of the middle plate 22.

In this embodiment, the first surface 11 of the seat 1 is provided with an embedding groove 111, and the fixing bracket can be placed in the embedding groove 111. When the fixing bracket is placed in the embedding groove 111, the whole electronic holder is in a storage state, and the volume is small, which is convenient for users to store, and at the same time is convenient for users to take and watch. When the fixing bracket is separated from the embedding groove 111, the whole electronic holder is in a use state, and the use state at least includes a first use state and a second use state. Of course, it may also include a third use state and a fourth use state as mentioned above.

In this embodiment, an elastic band 5 is arranged on the side of the second surface 12 of the seat 1, and the elastic band 5 is obliquely arranged relative to the extending direction of the seat 1. The obliquely arranged elastic band 5 can meet the user's demand for holding the electronic equipment 4 when using the electronic equipment 4 with the horizontal screen or the vertical screen, and can switch the horizontal screen between the vertical screen with one hand, which is convenient to use. In addition, to make it easy for users to take the holder, the second surface 12 of the seat 1 is provided with a concave buckle groove at a position near the elastic band 5, which is convenient for users to put their hands into the gap between the elastic band 5 and the seat 1.

In other embodiments, the width, thickness, color, texture, etc. of the elastic band 5 can be adjusted according to the use requirements. In addition, it can be considered to add anti-slip design (such as raised texture, rubber coating, etc.) on the elastic band 5 to improve the stability when the user holds it. The elastic band 5 may include rubber belt, silicone belt, nylon belt, etc. The selection of these materials is based on its durability, comfort, cost and whether it can meet the user's holding demand with a horizontal screen or a vertical screen.

Specifically, for the rectangular, oval, rounded rectangle and other shapes of the seat 1, the elastic band 5 is arranged obliquely relative to the extending direction of the seat 1, which means that the extending direction of the elastic band 5 is neither parallel nor perpendicular to the long axis of the seat 1. For the asymmetric seat 1, the elastic band 5 being arranged obliquely relative to the extending direction of the seat 1 means that the extending direction of the elastic band 5 is neither parallel nor perpendicular to the length direction of the seat 1. In this embodiment, the included angle between the extending direction of the elastic band 5 and the width direction of the seat 1 is acute, preferably 30-60 degrees, for the seat 1 with rectangular, oval, rounded rectangle and other shapes.

Specifically, the first surface 11 of the seat 1 is provided with two buckle grooves 14, and both ends of the elastic band 5 are provided with fasteners 51, which can be clamped into the buckle grooves 14 to realize the installation and fixation of the elastic band 5. It can be understood that the elastic band 5 of this embodiment is detachably connected with the seat 1, and in other embodiments, the elastic band 5 and the seat 1 can also be fixedly arranged.

In other embodiments, the elastic band 5 can adopt a retractable band or rope to automatically retract or stretch through springs or elastic materials. This design may allow the user to adjust the length and angle according to the specific needs of the user, which is more flexible. It may also be designed as a part adjustable in sections, and sections are connected by connectors (such as a button, hook and loop, etc.), and the user can adjust the angle and length between the sections according to needs.

In order to expand the application scene of the electronic equipment holder in this application, the seat 1 of the electronic equipment holder in this embodiment is provided with a third magnetic attraction member 9, and the electronic equipment 4 in this embodiment may be attracted to a magnetic wall by the arrangement of the third magnetic attraction member 9.

In other embodiments, the seat 1 may also be provided with a flexible clamping arm (such as a spring steel sheet)

for being clamped at the table edge, bookshelf and other positions. This design does not need to any patches or sticky materials, and thus has a strong adaptability.

What is claimed is:

1. A multifunctional electronic equipment holder, comprising a fixing bracket for placing electronic equipment and a seat for supporting the fixing bracket, wherein the fixing bracket is rotatably connected to the seat; and wherein the seat has a first surface and a second surface which are oppositely arranged, and the electronic equipment holder has a first use state and a second use state; and wherein in the first use state, the fixing bracket is arranged at an acute angle relative to the seat, and the first surface of the seat faces the fixing bracket; and in the second use state, the fixing bracket is arranged at an acute angle relative to the seat, and the second surface of the seat faces the fixing bracket, wherein an edge of the seat is provided with a slot, and a hinge shaft is arranged in the slot;

a damping structure is arranged on the hinge shaft, so that the fixing bracket is arranged at the acute angle relative to the seat in the first use state; and a limiting structure is arranged on the seat, so that the fixing bracket is arranged at the acute angle relative to the seat in the second use state, wherein the fixing bracket comprises a connecting rod and a base;

one end of the connecting rod is hinged with the seat, and the other end of the connecting rod is connected with the base; and the base is used for fixing the electronic equipment, and a distance between the base and the hinge shaft is adjustable.

2. The multifunctional electronic equipment holder according to claim 1, wherein the base is slidably connected with the connecting rod, and the position of the base on the connecting rod is adjustable.

3. The multifunctional electronic equipment holder according to claim 1, wherein the base is provided with a first magnetic attraction member, and the connecting rod is provided with a second magnetic attraction member.

4. The multifunctional electronic equipment holder according to claim 1, wherein a first surface of the seat is provided with an embedding groove capable of accommodating the fixing bracket, and the fixing bracket has a storage state of being located in the embedding groove and a use state of leaving the embedding groove; and the use state at least comprises the first use state and the second use state.

5. The multifunctional electronic equipment holder according to claim 1, wherein the seat is provided with an elastic band which is convenient to hold, and the elastic band is obliquely arranged relative to an extending direction of the seat.

6. The multifunctional electronic equipment holder according to claim 5, wherein the elastic band is arranged on a side of the second surface of the seat.

7. The multifunctional electronic equipment holder according to claim 6, wherein the second surface is provided with a concave buckle groove at a position near the elastic band.

8. A multifunctional electronic equipment holder, comprising:

a seat;

a fixing bracket rotatably connected with the seat and used for placing electronic equipment;

wherein when the fixing bracket rotates relative to the seat, a rotation angle can be maintained between the fixing bracket and the seat; and wherein the seat has a first surface and a second surface which are oppositely arranged, and the electronic equipment holder has a first use state and a second use state; and in the first use state, the fixing bracket is arranged at an acute angle relative to the seat, and the first surface of the seat faces the fixing bracket; and in the second use state, the fixing bracket is arranged at an acute angle relative to the seat, and the second surface of the seat faces the fixing bracket; and wherein the fixing bracket is provided with a magnetic attraction component, and the magnetic attraction component comprises:

a first magnetic attraction member that adsorbs the electronic equipment horizontally arranged on the fixing bracket; and a second magnetic attraction member matched with the first magnetic attraction member to adsorb the electronic equipment vertically arranged on the fixing bracket, wherein an edge of the seat is provided with a slot, a hinge shaft is arranged in the slot, and the seat is connected with the fixing bracket through the hinge shaft; and a damping structure is arranged on the hinge shaft, so that the fixing bracket is arranged at the acute angle relative to the seat in the first use state, and a limiting structure is arranged on the seat, so that the fixing bracket is arranged at the acute angle relative to the seat in the second use state, wherein the fixing bracket comprises a connecting rod and a base;

one end of the connecting rod is hinged with the seat, and the other end of the connecting rod is connected with the base; and the base is used for fixing the electronic equipment, and a distance between the base and the hinge shaft is adjustable.

9. The multifunctional electronic equipment holder according to claim 8, wherein the first magnetic attraction member is arranged on the base and the second magnetic attraction member is arranged on the connecting rod.

10. The multifunctional electronic equipment holder according to claim 8, wherein a third magnetic attraction member is further arranged on a side of the second surface of the seat.

11. The multifunctional electronic equipment holder according to claim 8, wherein the seat is provided with an elastic band obliquely arranged relative to an extending direction of the seat.

12. A multifunctional electronic equipment holder, comprising:

a seat provided with an elastic band which is convenient to hold; and a fixing bracket rotatably connected with the seat and used for placing electronic equipment;

wherein when the fixing bracket rotates, a rotation angle can be maintained between the seat and the fixing bracket; and wherein the seat has a first surface and a second surface which are oppositely arranged, and the electronic equipment holder has a first use state and a second use state;

in the first use state, the fixing bracket is arranged at an acute angle relative to the seat, and the first surface of the seat faces the fixing bracket;

in the second use state, the fixing bracket is arranged at an acute angle relative to the seat, and the second surface of the seat faces the fixing bracket;

wherein the fixing bracket is provided with a magnetic attraction component, and the magnetic attraction component comprises:

a first magnetic attraction member that adsorbs the electronic equipment horizontally arranged on the fixing bracket; and a second magnetic attraction member matched with the first magnetic attraction member to adsorb the electronic equipment vertically arranged on the fixing bracket, wherein an edge of the seat is provided with a slot, a hinge shaft is arranged in the slot, and the seat is connected with the fixing bracket through the hinge shaft; and a damping structure is arranged on the hinge shaft, so that the fixing bracket is arranged at the acute angle relative to the seat in the first use state, and a limiting structure is arranged on the seat, so that the fixing bracket is arranged at the acute angle relative to the seat in the second use state, wherein the fixing bracket comprises a connecting rod and a base;

one end of the connecting rod is hinged with the seat, and the other end of the connecting rod is connected with the base; and the base is used for fixing the electronic equipment, and a distance between the base and the hinge shaft is adjustable.

13. The multifunctional electronic equipment holder according to claim 12, wherein the seat is square, racetrack or oval, and an included angle between an extending direction of the elastic band and a width direction of the seat is an acute angle.

14. The multifunctional electronic equipment holder according to claim 13, wherein fasteners are arranged at both ends of the elastic band, a buckle groove is arranged on the seat, and the fasteners are detachably connected to the buckle groove.

15. The multifunctional electronic equipment holder according to claim 14, wherein the buckle groove is arranged on the first surface of the seat, the elastic band is bridged on the second surface of the seat, and the second surface is provided with a concave buckle groove at a position near the elastic band.

* * * * *